United States Patent [19]

Smith

[11] 3,748,711

[45] July 31, 1973

[54] LUBRICATED FAIRLEAD ROLLER ASSEMBLY

[75] Inventor: Duane R. Smith, Oswego, Ill.

[73] Assignee: Caterpillar Tractor Co., Peoria, Ill.

[22] Filed: May 19, 1971

[21] Appl. No.: 144,884

[52] U.S. Cl. ............................................. 29/116 R
[51] Int. Cl. ............................................. B21b 13/02
[58] Field of Search .................... 29/116 R; 277/92

[56] References Cited
UNITED STATES PATENTS

| 3,406,438 | 10/1968 | Reilly | 29/116 R |
| 3,180,648 | 4/1965 | Kupfert et al. | 277/92 |
| 2,169,625 | 8/1939 | Weiss et al. | 29/116 R |
| 3,086,782 | 4/1963 | Peickii et al. | 277/92 |
| 3,578,111 | 5/1971 | Miller | 277/92 |
| 2,282,589 | 5/1942 | Mayne | 29/116 R X |
| 2,546,200 | 3/1951 | Snavely | 29/116 R X |

*Primary Examiner*—Alfred R. Guest
*Attorney*—Fryer, Tjensvold, Feix, Phillips & Lempio

[57] ABSTRACT

A lubricated roller assembly comprising a shaft having a hub rotatably mounted thereupon by means of bearings spaced inwardly from the axial ends of the hub. Lubrication means for the roller assembly include an oil chamber formed within the hub and suitable seals disposed axially outwardly of the bearings for retaining the oil. The roller assembly is disposed between support plates on a fairlead arch and is mounted thereupon by trunnion caps which are secured within bores in the support plates.

5 Claims, 2 Drawing Figures

PATENTED JUL 31 1973

3,748,711

INVENTOR
DUANE R. SMITH

BY
Fryer, Tjensvold, Feix, Phillips & Lempio
ATTORNEYS

LUBRICATED FAIRLEAD ROLLER ASSEMBLY

BACKGROUND OF THE INVENTION

This invention relates to a lubricated self-contained roller assembly which is particularly adapted for use as a fairlead roller of a logging arch.

A fairlead roller is commonly employed in a logging arch to carry or guide a steel cable as it is reeled out or winched in. The current, commercially available, fairlead rollers are mounted to the logging arch by press-fitting the roller bearings within the hub, properly locating the hub between the support plates, and inserting the shaft through the support plates and bearings. The bearings in such an arrangement are lubricated with a heavy grease from a grease gun. It is common practice to operate skidder vehicles which utilize such roller assemblies in all types of weather and in below-freezing temperatures. As the temperatures decrease, the grease becomes stiffer thereby increasing the friction forces in the bearings and making the roller more difficult to rotate. In some instances frictional bearing drag is sufficient to cause the steel cable to slide with respect to the roller thereby causing undue wear on the cable and roller.

SUMMARY OF THE INVENTION

One advantage of this invention is to overcome the above, briefly-described problem by providing a fairlead roller assembly which is sealed and self-lubricated with a light-weight oil to reduce the frictional drag, particularly in cold temperatures. The roller assembly is prefabricated, filled with oil, and installed on the vehicle as a unit. Installation is accomplished by locating the roller assembly between the support plates on the fairlead arch and capturing the ends of the shaft with trunnion caps which are inserted through bores in the support plates. The length of the shaft is substantially the same axial length as the hub which it carries for facile fitting of the unit between the support plates.

DETAILED DESCRIPTION OF THE INVENTION

Figure 1:
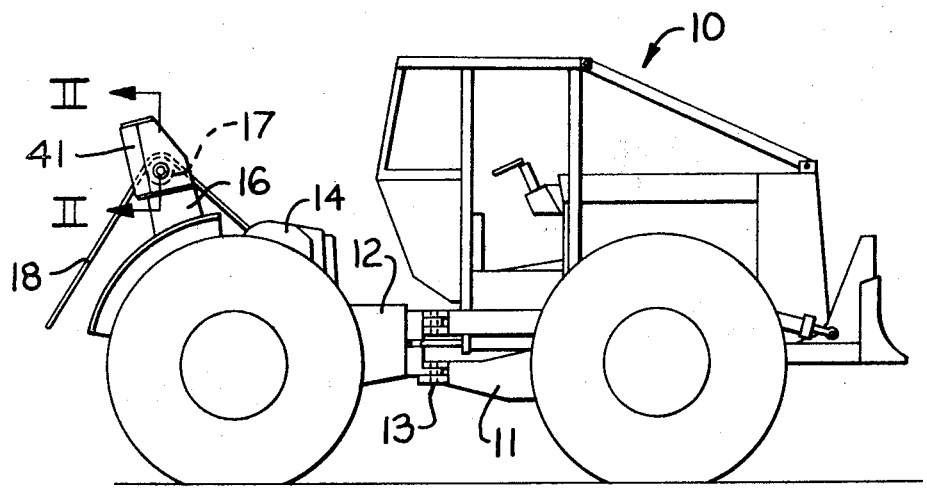
FIG. 1 is a side elevational view of a skidder vehicle embodying this invention.

Referring now to FIG. 1, a skidder vehicle 10 includes a front frame means 11 and a rear frame means 12 connected together at 13 for pivotal movement about a substantially vertical axis. The rear frame means 12 carries a winching device 14 and a fairlead arch member 16 which supports a roller assembly 17. Wound upon the winch 14 is a steel cable 18 which is also trained over the roller assembly 17 from where it extends rearwardly to the load being drawn by the vehicle.

In operation, cable 18 is reeled out from winching device 14 and its free end is attached to one or more cut logs or other load to be hauled. The cable is then taken up by the winch until the logs or the like are adjacent the rear of the vehicle and partially raised off the ground. The skidder vehicle is then driven to a desired location, dragging the partially supported logs or other load behind it.

Figure 2:
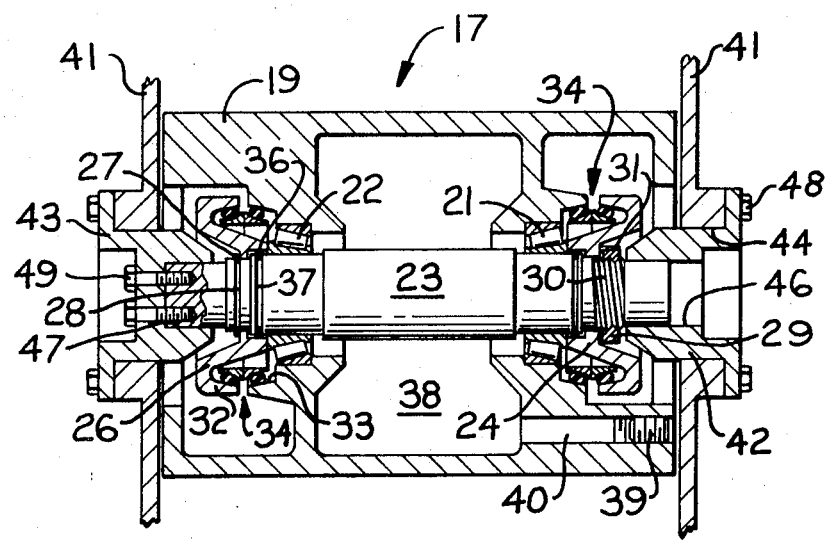
FIG. 2 is a partial cross-sectional view of the roller assembly taken along lines II—II of FIG. 1 and shows the roller assembly disposed within the supporting structure.

Referring now to FIG. 2, the fairlead roller assembly comprises a cylindrical hub 19 which is rotatably mounted upon a pair of axially spaced-apart tapered roller bearings 21 and 22, the inner races of which are carried upon shaft 23. Collar means 24 and 26 are disposed at each axial end of the shaft and are in abutment with the shaft-engaging inner races of bearings 21 and 22. Collar means 26 is retained upon the shaft 23 by means of a conventional snap ring element 27 located in a groove 28 on the shaft while collar means 24 is retained by means of a nut 29 which engages a threaded portion 30 of the shaft. The coaction of the nut 29 and shaft threading 30 enables one to adjust the end play in the bearings by a simple rotation of the nut. A locking device 31 is provided for holding the nut 29 in place after the bearing end play has been adjusted.

Each of the collar means has a flange portion 32 which cooperates with a tapered bore 33 in each axial side of the hub 19 to retain annular sealing means or floating metal ring seal assemblies 34 therebetween. Such a sealing means, per se, is fully disclosed in U.S. Pat. No. 3,180,648, which is assigned to the assignee of the instant application. Annular seal rings 36, which are arranged in groove means 37 formed in the shaft 23, cooperate with the sealing means 34 for retaining lubricating fluid within an annular chamber 38 formed within the hub 19. A plug means 39 may be removably inserted into one end of the hub to close off a charging port 40 for selectively providing or replenishing light-weight standard lubricating oil in the annular chamber 38.

The described fairlead roller assembly 17 is bench preassembled, the bearing preload is set, the chamber 38 is filled with lubricating oil, and the assembly is installed in the fairlead arch as a unit by inserting the roller assembly between support plates 41 of the fairlead arch 16. Since the roller assembly is preassembled, and subsequently inserted between the support plates 41, the axial length of the shaft 23 must be substantially the same as that of the hub 19.

The roller assembly 17 is firmly secured between the support plates 41 by mounting means such as trunnion caps 42 and 43 which are inserted through bores 44 in the side plates of the support means 41 to fixedly capture the ends of the shaft 23 within the trunnion bores 46 and 47, respectively. The trunnion caps are suitably secured to the support means 41 by means of capscrews 48, or the like. The shaft 23 is rigidly secured to trunnion cap 43 by bolts 49 to prevent rotation of the shaft with respect to the trunnion caps and to locate the roller assembly axially with respect to the side plates.

It should be noted that although the specific application of this construction in a fairlead arch has been described, it is apparent that other utilizations of the instant roller assembly are possible without departing from the spirit of the basic contribution.

Also, while the preferred embodiments of the present invention have been illustrated and described, it is to be understood that these embodiments are capable of variation and modification and are not limited to the precise details set forth but rather include such variations and modifications as fall within the scope of the appended claims.

What is claimed is:

1. A roller assembly mounted between spaced-apart support means comprising; shaft means having axial ends, hub means defining chamber means for containing lubricant therein, bearing means for rotatably supporting said hub means upon said shaft means, said bearing means being spaced inwardly from axial end portions of said hub means, collar means disposed upon said shaft means proximate said axial ends of said shaft means for retaining said bearing means, first and second retainer means disposed proximate said axial ends of said shaft means for retaining said collar means, one of said retainer means being adjustably attached to said shaft means whereby the force exerted thereby upon said collar means and said bearing means may be adjusted, annular sealing means disposed proximate each said axial end of said shaft means between said hub means and said shaft means for sealing said lubricant chamber means defined by said hub means, and mounting means for securing said roller assembly to said spaced-apart support means.

2. The invention of claim 1 wherein said annular sealing means comprise floating ring means positioned between said hub means and said collar means.

3. The invention of claim 1 further comprising a filling means communicating with said chamber means, said filling means including a passage means formed in said hub means and a plug means removably received therein, whereby lubricating fluid for said bearing means may be selectively supplied to said chamber means.

4. The invention of claim 1 wherein each of said spaced-apart support means has a bore means therein for receiving said mounting means, said mounting means comprising a pair of trunnion cap means disposed within said bore means for supporting said axial ends of said shaft means.

5. The invention of claim 1 wherein said shaft means has substantially the same axial length as said hub means whereby said roller assembly may be readily mounted between said spaced-apart means without increasing the spacing therebetween.

* * * * *